E. O. BEARDSLEY AND W. F. PIPER.

MACHINE FOR MAKING MOLDS.

APPLICATION FILED MAR. 26, 1921.

Reissued Feb. 28, 1922.

15,292.

7 SHEETS—SHEET 1.

Witness:
John Enders

Inventors:
Elmer O. Beardsley
Walter F. Piper
by Fred Gerlach
their Atty.

E. O. BEARDSLEY AND W. F. PIPER.

MACHINE FOR MAKING MOLDS.

APPLICATION FILED MAR. 26, 1921.

Reissued Feb. 28, 1922. 15,292.

7 SHEETS—SHEET 2.

Witness:
John Enders

Inventors:
Elmer O. Beardsley
Walter F. Piper
By Fred Gerlach
their Atty.

E. O. BEARDSLEY AND W. F. PIPER.

MACHINE FOR MAKING MOLDS.

APPLICATION FILED MAR. 26, 1921.

Reissued Feb. 28, 1922.

15,292.

7 SHEETS—SHEET 3.

Witness:
John Enders

Inventors:
Elmer O. Beardsley
Walter F. Piper
by Fred Gerlach
their Atty.

E. O. BEARDSLEY AND W. F. PIPER.

MACHINE FOR MAKING MOLDS.

APPLICATION FILED MAR. 26, 1921.

Reissued Feb. 28, 1922.

15,292.

7 SHEETS—SHEET 4.

Witness:
John Endere

Inventors.
Elmer O. Beardsley
Walter F. Piper
by Fred Gerlach
their Atty.

E. O. BEARDSLEY AND W. F. PIPER.

MACHINE FOR MAKING MOLDS.

APPLICATION FILED MAR. 26, 1921.

Reissued Feb. 28, 1922.

15,292.

7 SHEETS—SHEET 5.

Witness:
John Enders

Inventors:
Elmer O. Beardsley
Walter F. Piper
by Fred Gorlach
their Atty.

E. O. BEARDSLEY AND W. F. PIPER.

MACHINE FOR MAKING MOLDS.

APPLICATION FILED MAR. 26, 1921.

Reissued Feb. 28, 1922. 15,292.

7 SHEETS—SHEET 6.

Witness:
John Enders

Inventors:
Elmer O. Beardsley
Walter F. Piper
by Fred. Gerlach
their Atty.

E. O. BEARDSLEY AND W. F. PIPER.

MACHINE FOR MAKING MOLDS.

APPLICATION FILED MAR. 26, 1921.

Reissued Feb. 28, 1922.

15,292.

7 SHEETS—SHEET 7.

Witness:
John Enders

Inventors:
Elmer O. Beardsley
Walter F. Piper
By Fred Gerlach
their Atty.

UNITED STATES PATENT OFFICE.

ELMER O. BEARDSLEY, OF CHICAGO, AND WALTER F. PIPER, OF OAK PARK, ILLINOIS, ASSIGNORS TO THE BEARDSLEY & PIPER COMPANY, OF CHICAGO, ILLINOIS, A CORPORATION OF ILLINOIS.

MACHINE FOR MAKING MOLDS.

15,292. Specification of Reissued Letters Patent. Reissued Feb. 28, 1922.

Original No. 1,335,641, dated March 30, 1920, Serial No. 176,354, filed June 22, 1917. Application for reissue filed March 26, 1921. Serial No. 455,988.

*To all whom it may concern:*

Be it known that we, ELMER O. BEARDSLEY and WALTER F. PIPER, both citizens of the United States, and residents of Chicago, in the county of Cook and State of Illinois, and Oak Park, in the county of Cook and State of Illinois, respectively, have made certain new and useful Improvements in Machines for Making Molds, of which the following is a specification.

This invention has relation to foundry equipment and comprises primarily a novel construction of portable machine adapted to travel over the floor of a foundry and designed especially with a view to facilitating the gathering up of sand, riddling the same, and packing the sand in flasks adjacent to the machine.

An especial object of the invention has been to produce a machine of the above type having suitable traction mechanism whereby the machine may be readily moved to any desired place in the foundry under the control of an operator seated upon the machine, there being suitable elevating means for transferring the tempered sand from the ground or floor of the foundry to the riddle after conveying the riddled sand from the riddle to the impacting device by which the sand is supplied to the flasks, and the riddle and impacting device being peculiarly supported on a swinging jib and a swinging arm carried by said jib. The jib and swinging arm are under such control by the operator that they may be readily moved into various positions either in alinement or at angles to one another so as to afford much advantage by way of obtaining a wide range of operating area especially for the impacting device, enabling the latter to supply the riddled sand to flasks located over a very considerable area of surface, other advantages of a similar nature being obtained by the features of construction referred to as will appear more fully hereinafter.

The invention involves quite broadly the relative arrangement of the swinging jib and its coacting swinging arm as above referred to, the controlling instrumentalities therefor, the specific means whereby these parts are supported in a most advantageous manner upon the portable truck of the machine, and the specific mechanism employed for actuating the various parts referred to.

Included within the invention also is a special type of riddle embodying desirable cleaning instrumentalities together with an associated conventionally operable device for discharging from the machine foreign matter in the sand, which foreign matter is separated from the sand by the riddling mechanism. The cleaning means for the riddle comprises, furthermore, especially novel means for shifting the riddle bodily whereby to bring a fresh screening surface into play, said means involving the employment of automatic control instrumentalities the advantages of which will be obvious upon a thorough understanding of the operation of the invention.

The invention involves, furthermore, a special mounting of gathering and elevating means by which the sand is taken up by the machine and transferred to the riddling mechanism, said mounting being such as to facilitate in one phase of its action, the movement of the machine from one point in the factory to another, and in another phase being advantageous by reason of permitting yielding of the elevating unit, bodily, should the elevating means strike an obstruction in the sand being operated upon thereby.

A full understanding of the various features of the invention above referred to, together with special details of construction not mentioned but comprehended within the novelty of the improvements hereof, will be had upon reference to the following description taken in connection with the annexed drawings, in which:—

Figure 1:
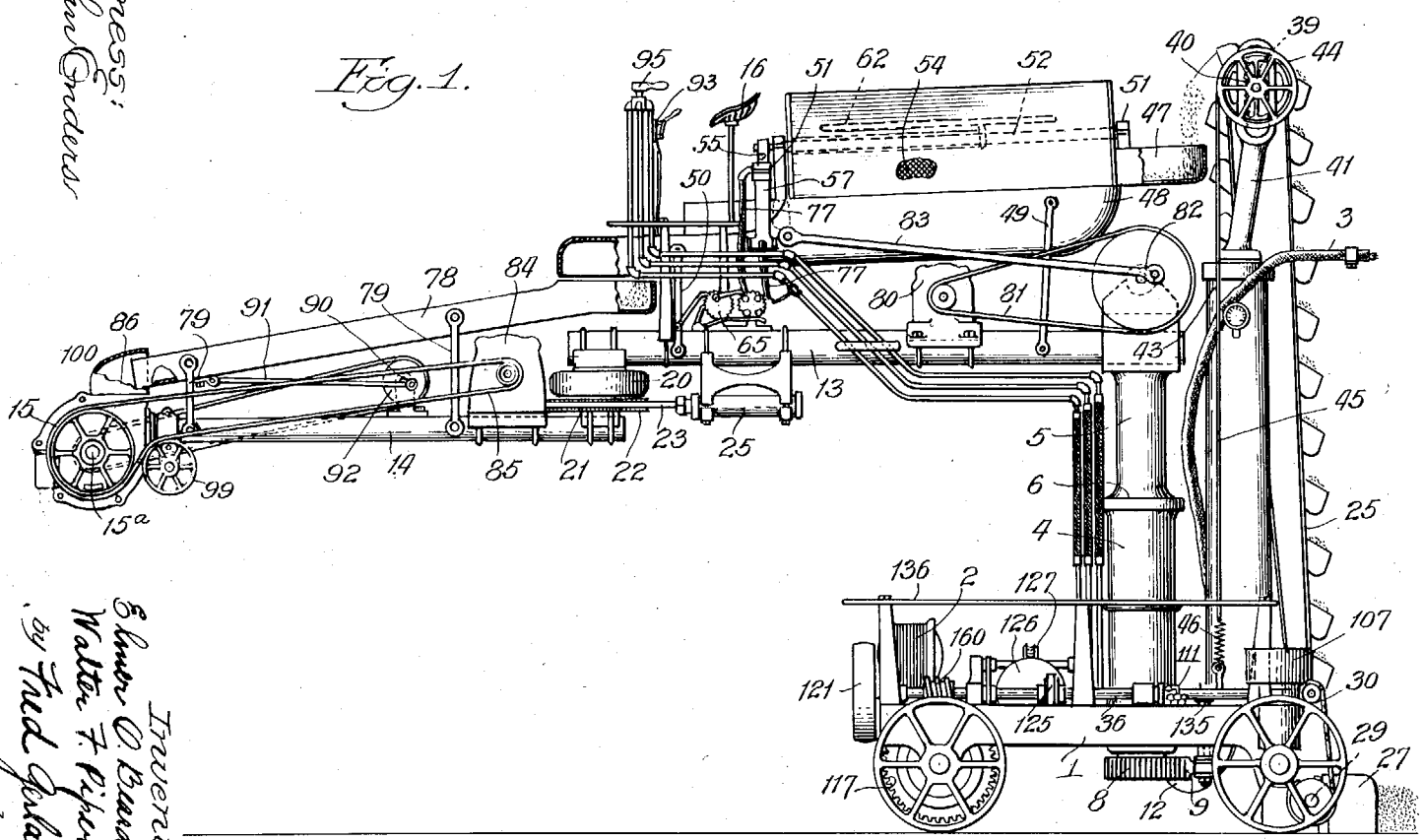
Figure 1 is a side elevation of a machine embodying the essential features of the invention.

Referring to Fig. 1 especially, it will be noted that the machine of this invention comprises a portable truck 1 which truck is equipped with certain traction driving mechanism whereby to cause slow movement of the truck in the direction in which the sand, previously tempered, is piled, say in a long pile, said mechanism being likewise controllable to operate the truck at a higher speed when it is desired to shift the machine from one place in the foundry to another. The traction driving instrumentalities will be briefly described hereinafter.

It is contemplated that the truck 1 shall be driven by a suitable motor 2 supported thereon and preferably though not necessarily an electric motor to which lead suitable ground wire connections, shown roughly in Fig. 1 at 3. The wires 3 will connect the motor 2, of course, with the source of supply of current and where the machine is to operate in a foundry or factory any suitable automatic take-up suspension means may be employed for the wires 3, or they may be permitted to drag upon the ground as desired, this being immaterial to the invention.

Figure 8:
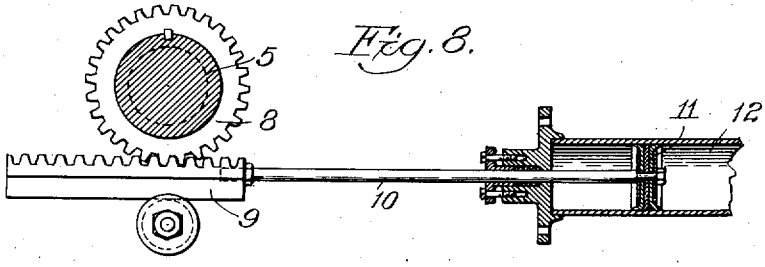
Fig. 8 is a fragmentary view partly in section, showing more clearly the pressure operated device employed for effecting swinging movement of the jib, said device being substantially the same as that for actuating the arm supported on the jib.
Figure 12:
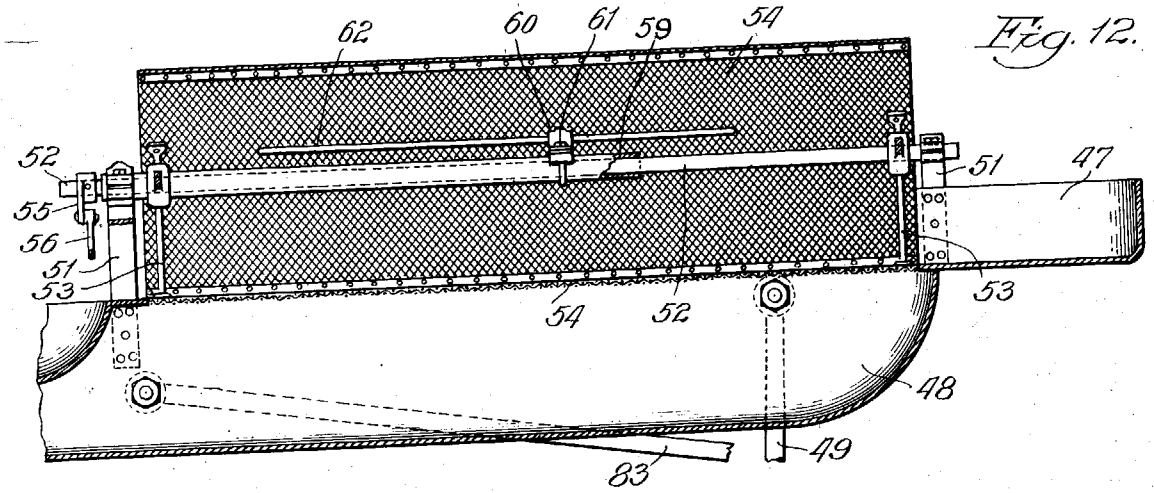
Fig. 12 is a longitudinal sectional view of the riddle and the supporting chute bringing out more clearly certain interior parts.
Figure 11:
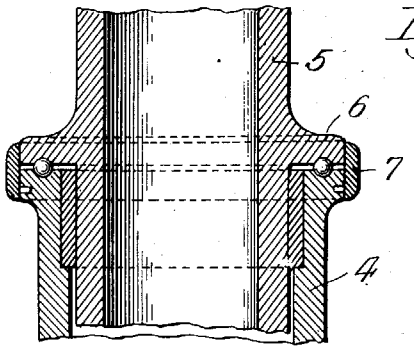
Fig. 11 is a sectional view of the supporting post and column of the truck on which the jib is mounted.

Upon the truck 1 is supported a hollow post 4 and journaled in said post is the column 5 having the annular flange 6 formed with a ball race on its under side between which and the ball race 7 at the top of the post 4 are provided suitable thrust bearings facilitating the ready rotative movement of the column 5 in the post 4. The column 5 extends entirely through the post 4 and at its lower end said column has affixed thereto a gear 8, see Figs. 1, 2 and 8, with which gear there is engaged a rack 9 carried by the end of a piston rod 10. The piston rod 10 is connected with a working pistion 11 in a cylinder 12, and the piston 11 is operable by a suitable pressure medium whereby to shift the rack 9 to thereby turn the post 5 and likewise correspondingly move the jib 13 which is secured in any substantial manner to the upper end of said post 5.

Supported at the outer end of the jib 13, is the swinging arm 14, the latter being equipped at its outer end with a sand projecting and impacting device 15 of the type set forth in United States Letters Patent No. 1,207,839 issued December 12, 1916. The sand after being riddle and conveyed to the device 15 is projected by the latter into the flasks over which the device 15 may be positioned under the control of the operator who is seated on the seat 16 carried by the jib 13, and by reason of the construction of the parts 13 and 14 it will become apparent that the machine of this invention affords an adjustment of the parts 13 and 14 whereby the sand driving or impacting device 15 may operate on flasks arranged over a comparatively large area of surface.

Figure 4:
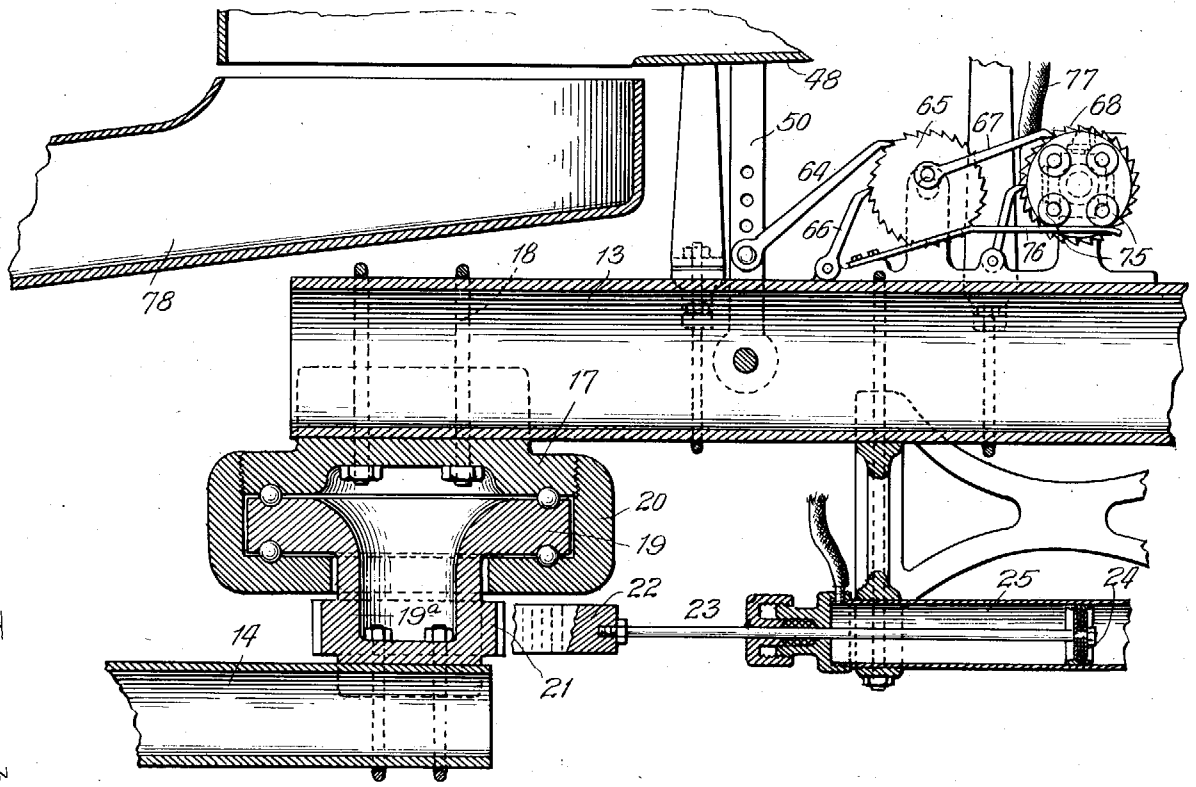
Fig. 4 is an enlarged sectional view showing principally the manner of mounting the swinging arm upon the jib, the actuating means for said arm and the automatic operating devices for operating the riddle.

The arm 14 is supported by the means best shown in Fig. 4, wherein it will be observed that a ball race 17 is attached to the outer end of the jib 13 by the U-shaped bolts 18, a rotative head 19 having ball races on its upper and lower surfaces being connected with the member 17 by a suitable coupling 20. The head 19 has a downwardly extending portion $19^a$ to which is directly bolted the arm 14 and to which also is fixed or keyed the gear 21 with which meshes a rack 22, like the rack 9. A piston rod 23 connected with the rack 22 is attached to its piston 24 operating in a working cylinder 25 and by the application of a suitable pressure medium to the opposite sides of the piston 24 it will be evident that the rack 22 may be actuated so as to turn the arm 14 relatively to the jib 13, various alined and angular adjustments of the parts 13 and 14 being thus obtainable in order to bring the device 15 into proper position over the flasks of the mold, for purposes well known in the art.

At the end of the machine opposite that from which the arm 14 extends is located the elevator 25 which is of the endless chain and bucket type and which is adapted to raise sand, previously tempered but not riddled, whereby to carry such sand to the riddling mechanism. The elevator 25 is disposed about at the middle of, and above a sand gathering device, the latter comprising a scraper casing 26, see Figs. 2 and 3 especially, said casing being bolted or otherwise fastened to the adjacent end of the truck and being somewhat of the shape of a scoop, having at its opposite ends the outwardly inclined gathering or deflecting blades 27. As the machine is slowly fed into the long pile of sand, the gathering device 26 obviously gathers the sand thereinto. Supported by the ends of the scraper casing of the gathering device are the conveying screws 28 supported on a shaft mounted in bearings on the casing 26. The screws 28 are reversely arranged in relation to the direction of the pitch of their spirals whereby the sand gathered into the casing 26 is caused to be conveyed from the ends of the casing toward the center, at which point is located the elevator 25. In this manner, therefore, the sand received in the casing 26 is sure to be caught by the elevator 25.

It is notable that the screws 28 are equipped with digging teeth 28[a] for breaking up sand which may be caked, whereby to facilitate the movement of the sand by the screws and the elevation of the sand in a properly reduced condition to the riddle.

Figure 3:
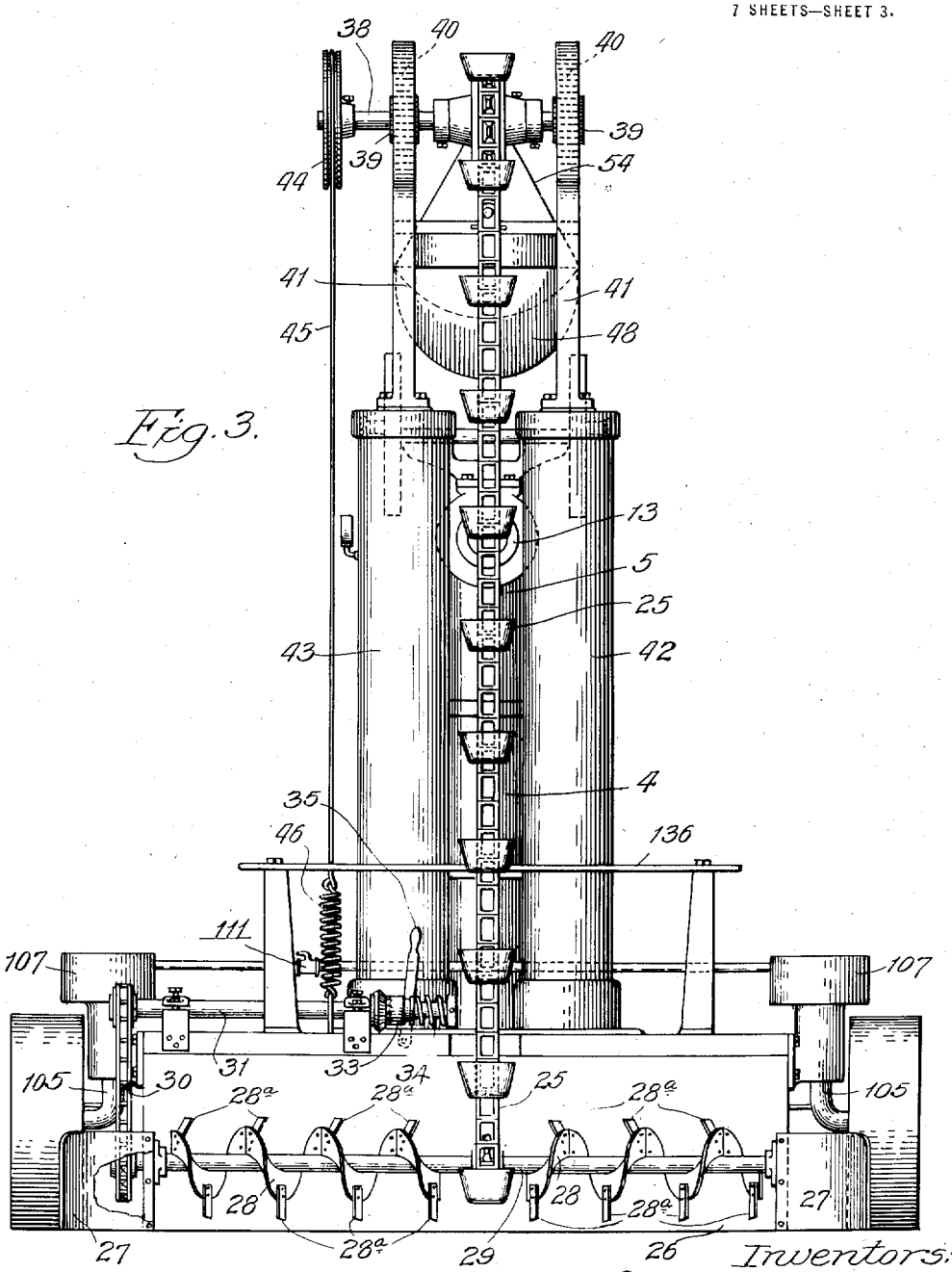
Fig. 3 is an end elevation of the machine.

The elevator 25 and the conveyor shaft 29 are driven simultaneously, the shaft 29 having a sprocket gear at one end connected by a sprocket chain 30, see Fig. 3, with a sprocket gear on the counter-shaft 31 above said shaft 29. The shaft 31 has a bevel gear 32 loose thereon but adapted to be connected with the shaft by a clutch 33, see Fig. 3, the latter being normally held in gear-connecting position by a spring 34 on the shaft 31 and there being provided a manual lever 35 to shift the clutch 33. The clutch 33 is provided with clutch teeth of an inclined form to cooperate with corresponding teeth on the gear 32, and this expedient is resorted to in order to insure a driving of the shaft 31 from the drive shaft 36 when the machine is being advanced toward the pile of sand. The clutch 33 automatically disconnects shaft 31 from the gear 32 in the event of reversal of the movement of the machine at which time, of course, a driving of the conveyor screws 28 and the elevator 25 is unnecessary and indeed undesirable. The shaft 36 is arranged longitudinally of the truck 1, is equipped with a gear 37 meshing with the bevel gear 32 aforesaid, and is driven by means that will be later set forth in a general manner.

From the foregoing, it will be apparent that the sand of the pile toward which the machine is fed will be properly gathered by the machine and elevated by the elevator 25. At its upper end, the elevator 25 is supported by a shaft 38 on which is carried loosely the upper sprocket gear about which the endless chain of the elevator passes. The shaft 38 itself is associated with pinions 39 keyed thereto and meshing with racks 40 at one side of the slotted upper portions of pedestals 41, said pedestals being bolted or otherwise secured to the upper ends of cylinders 42 and 43, the purpose of which will be presented hereinafter.

On the shaft 38, is fixed a grooved pulley 44 to which is connected one end of a cable 45, said cable extending downwardly to a point of connection with a coiled spring 46 the latter being in turn secured to the truck 1. The purpose of the connecting means 44, 45 and 46 is to afford a yielding counterbalance or tension device cooperating with the elevator in such a manner as to permit a yielding downward of the latter in the event some obstruction should become caught between the lower sprocket wheel on the conveyor shaft 29 and the conveyor chain passing about said wheel; also the means just described is an automatic tension means for taking up slack in the conveyor-chain, as will be readily obvious.

The material which is raised by the conveyor 25 is dropped by the buckets of the conveyor into a hopper 47 from which hopper the material is fed into the riddling mechanism now to be described.

Supported on the jib 13 is a conveyor-chute 48 superposed in relation to the jib and mounted for a back and forth or vibrating movement upon link bars 49 and 50 connecting the parts 48 and 13. Above the chute 48 and mounted in bearings on suitable brackets 51 attached to the chute is a shaft 52 equipped with spiders 53, the outer ends of the arms of which are bolted or otherwise attached to the sides of a triangular shaped riddle 54. The riddle 54 has two perforated sides forming riddling or screening elements and one imperforate side 54[a]. The hopper 47 is open at one end and the material deposited therein from the elevator 25 is adapted to gravitate into the adjacent open end of the riddle 54. One of the perforate sides of the riddle 54 is always operative and the material is sifted by the riddle as an incident to the vibrating movement of the latter with the chute 48, said chute 48 being inclined in order to effectuate its conveying function.

Figure 5:
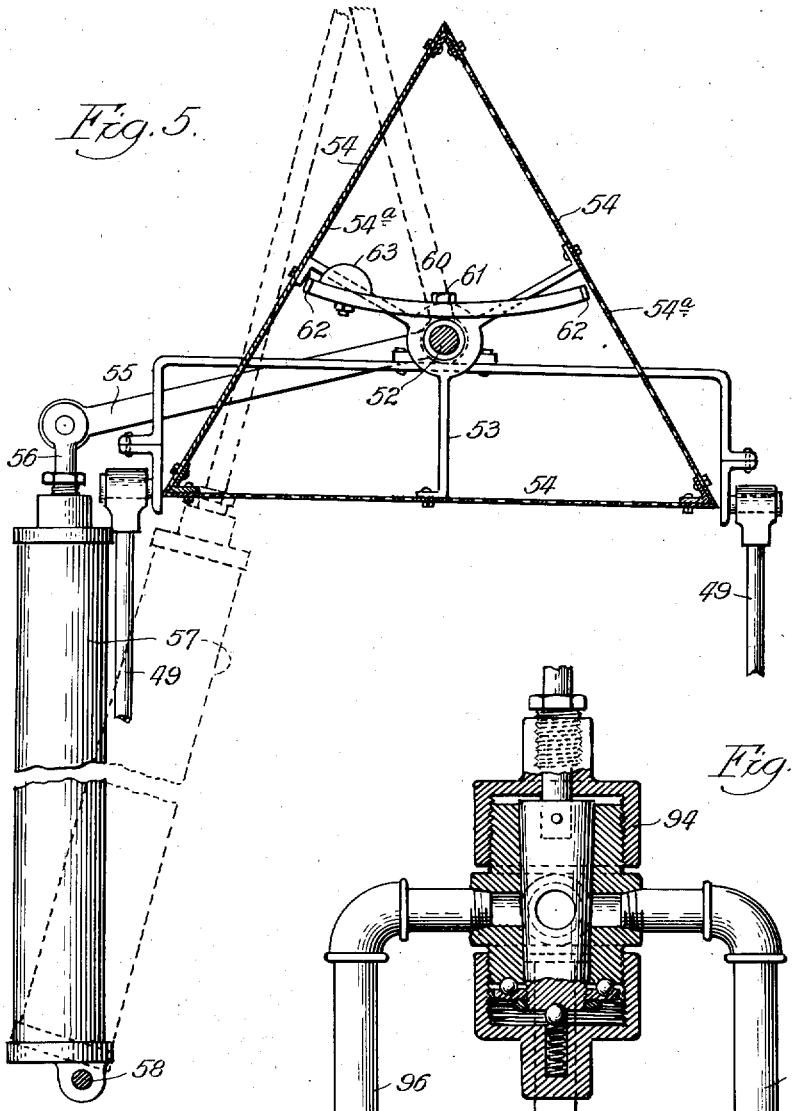
Fig. 5 is a cross sectional view of the riddle showing a certain portion of the operating means for intermittently imparting a rotative movement to said riddle and likewise showing the cleaning mechanism in part.

To the lower ends of the shaft 52 is fixedly secured an arm 55 which arm is pivotally connected at its outer end with the rod 56 of a piston operating in a vertical cylinder 57 pivotally supported at its lower end at 58 on a suitable bracket attached to the chute 48. The pressure medium by which the pistons of the cylinders 12 and 25 are operated is also adapted to be supplied to the cylinder 57 in such a manner that the piston in the latter may be raised and lowered intermittently. The raising movement of the piston 57, see Fig. 5, is intended to rotate the riddle 54 one-third of a revolution whereby to bring a fresh cleaned perforate side of the riddle lowermost, and to raise the previously lowermost perforate side for cleaning operation thereon by certain cleaning devices to be described.

The imperforate side 54[a] of the riddle is simply an inactive side portion, the two perforated sides being alternately brought into play by the reverse movements of the piston in the cylinder 57. Projecting from the bracket 51 at the lower end of the riddle 54 is a tubular support 59 through which the shaft 52 passes and on this support 59, which extends only about two-thirds the length of the riddle 54, is carried the riddle cleaning device. The cleaning device just mentioned includes a cross piece 60 loosely and rockingly mounted on the member 59 by means of a fastening bolt 61, see Fig. 5, said cross-piece 60 having longitudinal knockers 62 at its opposite ends adapted to hit against the sides of the riddle 54 whereby to effect cleaning of the latter by dislodging any materials adhering thereto and tending to stop perforations in said sides. At one end the cross piece 60 is weighted, as shown at 63, and the weight means has a tendency to jar the cross piece to cause rocking or vibration of the cleaning device, as an incident to the longitudinal vibratory movement of the chute 48. The cleaning action of the cleaning device is thought to be obvious from the foregoing.

Figure 9:
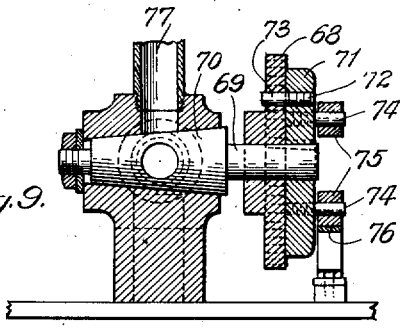
Fig. 9 is a sectional view bringing out more clearly certain parts of the automatic means whereby the riddle is shifted rotatively to bring a cleaned screening surface into play.

We contemplate the provision of automatic means for controlling the cleaning bodily movement of the riddle 54, in a rotative manner, to bring a fresh or cleaned perforate side thereof into action. The automatic means is seen best in Figs. 1 and 4 and involves the provision of a pawl 64 pivoted to the link bar 50 and engaging a ratchet wheel 65 on the jib 13. A reverse-movement-preventing pawl 66 also coacts with the wheel 65 and is arranged below the feed pawl 64. The ratchet wheel 65 has a feed pawl 67 eccentrically connected thereto and operable thereby to engage and turn a ratchet wheel 68, see Figs. 4 and 9, the ratchet wheel 68 being loose upon the spindle 69 of a four-way valve 70. The valve 70 has keyed thereto, alongside the wheel 68, a disk 71 and the disk 71 has a pin 72 projecting laterally therefrom into a slot 73 of the wheel 68. The pin 72 projects from the inner side of the disk 71 and on the outer side of the latter are provided a plurality of studs 74 carrying rollers 75 which are adapted to be engaged by a flat spring 76 bolted to the jib 13.

The pressure medium used for operating the various pistons in the several cylinders heretofore described is adapted to be controlled by the valve 70 in such a manner as to be caused to pass through flexible conduits 77 to opposite ends of the cylinder 57 to act upon opposite sides of the piston of the latter. The valve 70 is intermittently actuated as the chute 48 vibrates back and forth, as an incident to the turning of the ratchet wheel 68, the latter being adapted to move independently of the disk 71 but so as to intermittently turn said disk sufficiently to cause the spring 76 to act upon the rollers 75 at certain intervals of time in order to give the valve 70 a quick turning movement. The quick turning movement of the valve 70 effected at such intervals of time is intended to momentarily open the main pressure line to the cylinder 57 whereby the piston in the latter will be quickly moved to turn the riddle one-third of a revolution in the manner previously described. The foregoing action of course brings a fresh cleaned perforate side of the riddle lowermost and the operation is performed quickly in order that there may be no time interval of inactivity so far as the functioning of the riddle is concerned. The provision of the pin and slot connection between the parts 71 and 68 is designed to permit of the quick partial revolution of the disk 71 and corresponding movement of the valve 70 desirable for the purposes above described. It is contemplated additionally that the connection between the feed pawl 64 and the link bar 50 may be adjustable as by the provision of a plurality of openings for the pivot connection between these two parts so that the intervals of time between the rotative movements of the riddle may be shortened or lengthened as may be required for most effective operation of the machine. The operation of the riddle in the manner just described is of course, however, entirely automatic.

After the sand has sifted through the riddle 54 and is deposited in the chute 48 it is conveyed by the chute 48 to a second chute 78. To insure that the sifted material will pass into the chute 78 the portions of the chutes 48 and 78 which overlap at adjacent ends are preferably somewhat enlarged and these portions are likewise located concentric in relation to the pivotal connection established by the parts 17, 19 and 20, intermediate the jib 13 and the boom 14. Under these conditions, no matter at what relative angles the jib and its arm are disposed, and also when these parts are in alinement, communication is properly established between the adjacent ends. It is preferred that the chutes 48 and 78 be covered at the top portions.

The chute 78 is supported by link bars 79 similar to the bars 49 and 50 supporting the chute 48 and the means for vibrating the chutes 48 and 78 are quite analogous, involving the provision for the chute 48 of a motor 80 having a belt 81 arranged to drive a crank-shaft 82 disposed in suitable bearings just above the post 5. A pitman 83 connects the crank of the shaft 82 with the chute 48 and the shaft 82 may have a fly wheel suitably counter-balanced to compensate for the load of the chute 48 and contents, all as conventionally employed in driving mechanism of this type.

The driving means for the chute 78, which is inclined similarly to the chute 48, comprises a motor 84 carried by the arm 14 and connected by a drive belt 85 with a pulley wheel 86 on the shaft 15ª of the impacting device 15, said shaft 15ª carrying an impacting or sand driving member of the type referred to in the Letters Patent previously identified. On the end of the shaft 15ª, opposite the pulley wheel 86, is a pulley 87 connected by a belt 88 with a pulley 89 on a shaft 90, having a drive wheel 92 provided with a wrist pin connected by a pitman rod 91 with the chute 78, see Fig. 1, and the dotted line showing in Fig. 2.

The motors 2, 80 and 84 are electric motors of well known types and are adapted to be controlled by suitable electric connections leading to a switch-board 93 supported in front of the operator seated on the seat 16. As these connections are not material to the invention, they are not described in detail, being conventional.

Figure 6:
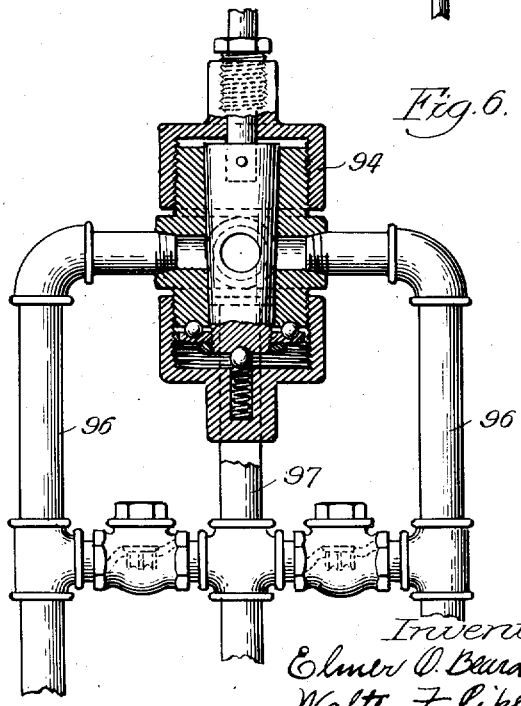
Fig. 6 is a fragmentary view partly in section, illustrating the type of four-way control valve utilized for controlling admission and release of pressure at the opposite sides of the working pistons in the working cylinders employed for causing swinging movement of the jib and its supported swinging arm.

Situated also in front of the seat 16 convenient for control by the operator are two four-way valves 94 and 95, one for controlling the application of pressure on the action of the pressure medium on the piston in the cylinder 12, for operating the jib 13, and the other for controlling the pressure on the piston in the cylinder 25 for actuation of the arm 14 relatively to the boom. The four-way valves 94 and 95 are of the type shown in Fig. 6, a type specially constructed by us for the purposes of our invention. It is to be understood, however, that any suitable effective type of four-way valve may be employed in lieu of those just referred to, the object of these valves being to effectively control the operation of the respective pistons in the cylinders 12 and 25 as aforesaid.

Since the detailed construction of the valves 94 and 95 does not form a part of the present invention, this feature will be generally described only. Each of the valves 94 and 95 embodies a casing connected by pipes 96 with opposite ends of the respective cylinder, the piston of which is controlled by the valve. Likewise said valve-casing is connected by pipes 97, one leading to a pressure storage reservoir 43 and the other to a pressure receiving reservoir 42, both of which reservoirs are shown in Fig. 3. The pressure medium used for the purposes of the invention may be oil, water or a suitable fluid medium and we provide a pump 98, see Fig. 2, which pump is connected so as to force the pressure medium received back into the reservoir 42, into the reservoir 43. In other words, it may be noted that the pressure medium as it exhausts from the cylinders 12 and 25 passes to the reservoir 42 and enters the cylinders 12 and 25 from the reservoir 43. Furthermore the valves 94 and 95 are arranged in such manner in respect to the pipes or conduits connecting the parts 12, 25, 42 and 43 as to readily permit the operator to properly control the passage of the fluid pressure medium into and out of the cylinders, and consequent operation of the jib 13 and its arm 14. Since the conduits or pipe connections for the four-way valves 94 and 95 may be conventional, they are not illustrated in detail.

It is contemplated to employ an idler pulley 99 supported at the outer end of the arm 14 to support the belt 85 so that the latter will not be in the way of workmen, operating around the machine. Likewise the casing of the impacting or sand driving device 15 is suitably connected by a casing member 100 with the chute 78, the latter entering the rear end of said casing member 100.

Figure 2:
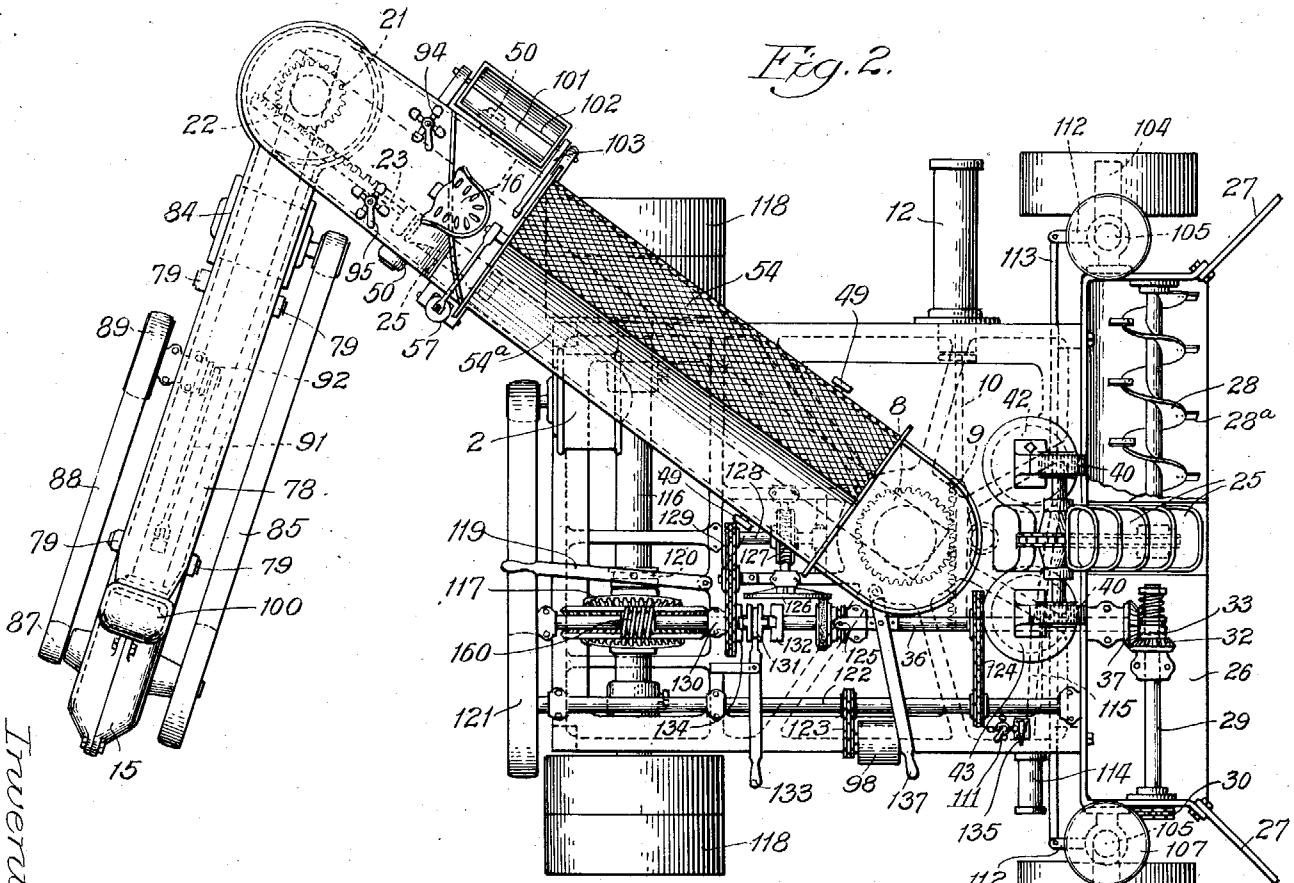
Fig. 2 is a top plan view, dotted lines showing primarily the operating devices whereby to effect simultaneous or relative movements of the swinging jib and arm carried thereby.

At one side of the seat 16, see Fig. 2, is located a box 101 supported by a shaft 102 so as to be rotated with the latter for dumping purposes. A lever 103 is connected to turn the shaft 102 in order to dump the box 101, and said box is located so that foreign matter passing longitudinally through the riddle 54, and prevented by the screens from dropping into the chute 48, may pass to the box 101. After accumulation of sufficient of the foreign materials in the box 101, said box may readily be dumped by the operator into a wheel barrow, or other receptacle, as an incident to actuation of the lever 103.

Figure 7:
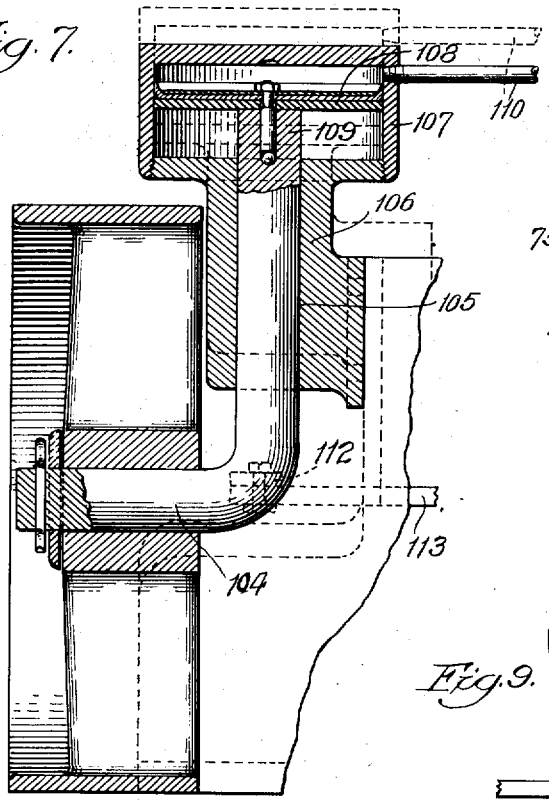
Fig. 7 is a fragmentary view, partly in section, bringing out more clearly the mounting of the elevator end of the machine upon the ground wheels and illustrating the means to elevate said end to raise the scraper for facilitating movement from one place to another.
Figure 10:
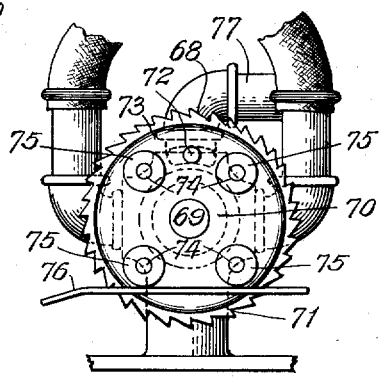
Fig. 10 is a side view of the automatic valve mechanism controlling the turning of the riddle.

Referring to Figs. 3 and 7 especially, it is to be observed that the supporting wheels of the truck 1 located adjacent to the gathering device 26 are mounted upon stub axles 104 carried by vertical spindles 105, the latter journaled in suitable brackets 106 fixed to the truck 1. At the upper ends of the brackets 106 are provided cylinders 107. In the cylinders 107, one of which is provided for each spindle 105, is a piston 108 having a ball bearing connection 109 with the spindle. Connected with the cylinders 107 is a pressure medium supply pipe 110 and a controlling valve 111 near the pump 98 which is adapted to be operated so as to cause the pressure medium to enter the cylinders 107 whereby to cause relative movement of the cylinders and their pistons 108 such that the end portion of the truck supported by the wheels adjacent the elevator 25 may be caused to be raised bodily a short distance, and maintained raised by maintaining the pressure in the cylinders 107 acting upwardly on the tops of said cylinders and downwardly on the pistons 108. In view of the foregoing provisions the frame of the truck and the supported parts may be raised with the gathering device or scraper casing 26 so as to elevate the latter a sufficient distance from the ground to clear all ordinary obstacles which might be in its path when the machine is being moved from one place to another.

For the purpose of facilitating steering of the machine we contemplate the employment of steering arms 112 projecting rearwardly from the stub axles 104 and attached to a steering bar 113, see Fig. 2. A cylinder 114 on the truck 1 adjacent to the pump 98 has its piston rod connected by a link 115 with the steering bar 113 and any suitable provision may be made for supplying a pressure medium to opposite sides of the cylinder 114 in order to shift the bar 113 and correspondingly turn the steering wheels supported by the stub-axles 104.

As previously premised herein, there is utilized for the purposes of this invention suitable traction means which is designed similarly to many mechanisms of this type, namely for the purpose of moving the machine slowly when operating in connection with its regular work, namely the elevating, riddling and conveying of the sand to the flasks, and adapted to move the machine at a greater speed when the purpose in view is to transport the machine from one place to another. Since the traction operating instrumentalities as used by us may be modified to a considerable extent and we do not wish to be restricted to the employment of the particular means used, any more than to the employment of other conventional parts, such as motors, pulleys, and connections, the traction means will be only generally described in connection with the driving instrumentalities therefor.

We employ a rear split axle 116, see Fig. 2, with a differential 117 of any suitable type connecting the sections of the axle. The rear traction wheels 118 are suitably mounted in turn with the sections of the axle 116 and they may be turned independently as an incident to the functioning of the differential gearing 117 as when it is desired that the machine be steered a more or less crooked course whether for operating upon a crooked, elongated pile of sand, or for purposes of general portability.

We utilize a lever 119 and a locking pin device 120, see Fig. 2, to lock the sections of the axle 116 together, and incapacitate the differential gearing 117, when it is desired that the machine move in a substantially straight line such as would be desirable when traveling longitudinally of a straight pile of sand being gathered and elevated thereby. The driving instrumentalities employed are substantially as follows: The motor 2 by a belt connection 121 drives a shaft 122, this shaft 122 drives the pump 98 by raising of the sprocket chain connection 123 with the rotor of the pump. The shaft 122 drives the shaft 36 previously described as operating the conveyor shaft and elevator by reason of the provision of sprocket chain driving connections 124, see Fig. 2. The shaft 36 carries a friction gear 125 movable across the face of a friction disk 126 and thereby adapted to drive said disk at a greater or less speed as required. The disk 126 is carried by a shaft and suitable worm gearing 127 connects the shaft of the disk 126 with the shaft 128, the latter being connected by sprocket chain connections 129 leading to a shaft 130 carrying a worm 160 by which the differential gearing 117 is driven. This is the usual driving connection established for slow movement of the machine in performing its work on the pile of sand.

When it is desired to move the machine to transfer it from one place to another, at greater than its ordinary speed, a direct connection between the shaft 36 and the shaft 130 may be established by means of the clutch 131 keyed on the shaft 130 and engageable with a clutch element 132 on the shaft 36. The clutch element 131 is operable by a suitable manual lever 133 and the sprocket chain connection 129 operates about a sprocket wheel loosely mounted on the shaft 130. It is necessary, therefore, that the lever 133 be moved to throw the clutch 131 into engagement with the clutch element 134 on the shaft 130 if the slow and variable driving connection between the shafts 36 and 130 is to be used. In addition to the control of movement of the machine by the switch 93 in front of the seat 16, there is located adjacent to the valve 111 and therefore near the pump 98, a second switch 135 operable to control the motor 2 for moving the machine around the factory in a reverse direction.

There is provided a protecting plate 136 above the truck 1 and extending over certain parts of the driving gearing, protecting these parts against injury from falling sand or substances and also forming a supporting deck on which the operator may stand when necessary.

A lever 137 is preferably employed for shifting the friction wheel 125 across the surface of the friction disk 126 whereby to govern the action of the variable speed transmission mechanism set forth, under certain conditions of service.

An important characteristic of the invention is that the ramming head is supported by a jib and arm which are pivotally connected so as to permit only lateral movement, and, as a result, the ramming head at the outer end of the arm can be moved laterally and bodily to project the sand into all portions of the flask without varying the angle of delivery of the sand in the mold. In practice, it has been found that the most efficient angle of delivery is substantially vertical when the mold is horizontal, because the wads will then successively pack in or build up the mold with the least displacement of the previously delivered sand in the mold. When the angle of delivery is variant or substantially obtuse or acute with respect to the general plane of the mold, the projecting wads of sand will tend to displace and disrupt the sand which has been previously delivered into and packed in the mold.

Having thus described the invention, what is claimed as new is:

1. In a machine for making molds, the combination of a movable carriage, a sand projector mounted on the carriage and comprising a rotor, means mounted on the carriage to feed sand from the floor to said projector, and means mounted on the carriage for operating the rotor and the feed-means.

2. In a machine for making molds, the combination of a movable carriage, a sand projector mounted on the carriage and movable relatively thereto to project sand into different portions of a flask, and comprising a rotor, means mounted on the carriage to feed sand from the floor to the projector, and means mounted on the carriage for operating the rotor and the feed-means.

3. In a machine for making molds, the combination of a movable carriage, a sand projector mounted on the carriage and comprising a rotor, means mounted on the carriage to feed sand from the floor to said projector, comprising a conveyor adjacent the floor and an elevator, and means mounted on the carriage for operating the rotor and the feed-means.

4. In a machine for making molds, the combination of a movable carriage, a sand projector mounted on the carriage and movable relatively thereto to project sand into different portions of a flask, and comprising a rotor, means mounted on the carriage to feed sand from the floor to the projector, comprising a conveyor adjacent the floor and an elevator, and means mounted on the carriage for operating the rotor and the feed-means.

5. In a machine for making molds, the combination of a movable carriage, a sand projector mounted on the carriage and comprising a rotor, means mounted on the carriage to feed sand from the floor to said projector, comprising a screw-conveyor adjacent the floor and a bucket-elevator, and means mounted on the carriage for operating the rotor and the feed-means.

6. In a machine for making molds, the combination of a movable carriage, a sand-projector mounted on the carriage and movable relatively thereto to project sand into different portions of a flask, and comprising a rotor, means mounted on the carriage to feed sand from the floor to the projector, comprising a conveyor adjacent the floor, an elevator and conveying means movable with the projector, and means mounted on the carriage for operating the rotor and the feed-means.

7. In a machine for making molds, the combination of a movable carriage, a sand-projector mounted on the carriage and comprising a rotor, means mounted on the carriage to feed sand from the floor to said projector, and means mounted on the carriage for driving the rotor and propelling the carriage.

8. In a machine for making molds, the combination of a movable carriage, a sand-projector mounted on the carriage and movable relatively thereto to project sand into different portions of a flask, and comprising a rotor, means mounted on the carriage to feed sand from the floor to the projector, a riddle mounted on the carriage, and means mounted on the carriage for operating the rotor and the feed-means.

9. In a foundry machine of the class described, the combination of a support, a jib mounted thereon for horizontal swinging movement, an arm pivoted to the outer end of the jib for horizontal swinging movement, conveying devices disposed upon the jib and arm lengthwise thereof and in communication with one another, means for supplying sand to the conveying devices of the jib for delivery by the conveying device of the arm, and a projector comprising a rotor, mounted on the outer end of the arm.

10. In a foundry machine of the class described, the combination of a portable truck, a jib mounted thereon for horizontal swinging movement, an arm pivoted to the outer end of the jib for horizontal swinging movement, conveying devices disposed upon the jib and arm lengthwise thereof and in communication with one another, and a riddle supported by one of said conveying devices and adapted to derive motion therefrom.

11. In a foundry machine of the class described, the combination of a portable truck, a jib mounted thereon for horizontal swinging movement, an arm pivoted to the outer end of the jib for horizontal swinging movement, inclined chutes disposed upon the jib and arm lengthwise thereof and in communication with one another, means for imparting longitudinal vibratory movement to said chutes, a riddle supported by one of said chutes, and cleaning means for said riddle operable as an incident to the vibratory actuation of the chute supporting said riddle.

12. In a foundry machine of the class described, the combination of a portable truck, a jib mounted thereon for horizontal swinging movement, an arm pivoted to the outer end of the jib for horizontal swinging movement, inclined chutes disposed upon the jib and arm lengthwise thereof and in communication with one another, means for imparting longitudinal vibratory movement to said chutes, and a riddle supported by the chute carried by the jib and inclined in the direction of inclination of said chute and movable therewith.

13. In a foundry machine of the class described, the combination of a portable truck, a jib mounted thereon for horizontal swinging movement, an arm pivoted to the outer end of the jib for horizontal swinging movement, inclined chutes disposed upon the jib and arm lengthwise thereof and in communication with one another, means for imparting longitudinal vibratory movement to said chutes, a riddle supported by the chute carried by the jib so as to supply riddled materials to said chute, and automatic cleaning means mounted in said riddle and operable as an incident to actuation of the chute supporting the riddle.

14. In a foundry machine of the class described, the combination of a portable truck, a jib mounted thereon for horizontal swinging movement, an arm pivoted to the outer end of the jib for horizontal swinging movement, inclined chutes disposed upon the jib and arm lengthwise thereof and in communication with one another, means for imparting longitudinal vibratory movement to said chutes, a riddle supported by the chute carried by the jib so as to supply riddled materials to said chute, automatic cleaning means mounted in said riddle and operable as an incident to actuation of the chute supporting the riddle, said riddle embodying a plurality of perforated surfaces and means to automatically bring said surfaces into action at different times.

15. In a foundry machine of the class described, the combination of a portable truck, a jib mounted thereon for horizontal swinging movement, an arm pivoted to the outer end of the jib for horizontal swinging movement, inclined chutes disposed upon the jib and arm lengthwise thereof and in communication with one another, means for imparting longitudinal vibratory movement to said chutes, and a riddle supported by one of said chutes and comprising a plurality of perforate surfaces, and means operable as an incident to the vibratory movement of the chute supporting the riddle whereby to bring said perforate surfaces of the riddle into play at different times.

16. In a foundry machine of the class described, the combination of a support, a jib mounted thereon, a conveying chute supported on the jib, means for actuating said chute to cause passage therethrough of material delivered to the same, a riddle mounted on said chute and movable incident to actuation of the latter whereby to supply riddled materials to the chute, said riddle embodying a plurality of perforate surfaces and means for bringing said surfaces into play intermittently.

17. A machine as claimed in claim 16 wherein the surfaces of the riddle are intermittently brought into action by automatic means controlled by the means for actuating the chute.

18. In a machine for filling molds, the combination of a rotatable sand projector, means for driving the projector, means for movably supporting the projector so it can be shifted laterally to project sand into all portions of the mold at a substantially non-variant angle of delivery and means to feed sand to the projector.

19. In a machine for filling molds, the combination of a sand projector comprising a casing and a rotor, means for driving the rotor, means for movably supporting the projector so it can be shifted laterally and bodily to project sand into all portions of the mold at a substantially non-variant angle of delivery and means to feed sand to the projector.

20. In a machine for filling molds, the combination of a sand projector, mechanism for driving said device, means for feeding sand to said projector, and a supporting structure comprising a plurality of members which are pivoted to swing horizontally, the projector being supported at the free end of one of said members, the pivotal connections for said members permitting lateral bodily movement of the projector to project the sand at a substantially non-variant angle of delivery.

21. In a machine for filling molds, the combination of a sand projecting device, mechanism for driving said device, means for feeding sand to said device, and a supporting structure comprising a jib and an arm which are both pivoted to swing horizontally, the projecting device being supported at the free end of said arm, the jib and arm permitting bodily lateral movement of the projecting device to project the sand at a substantially non-variant angle of delivery.

22. In a foundry machine of the class described, the combination of a portable truck, a horizontally swinging jib supported thereon, a horizontally swinging arm pivoted to the jib, vibratory conveying chutes carried by the jib and arm respectively and in communication with one another, a rotary riddle carried by one of said chutes, and automatic means operable as an incident to the movement of the chute supporting the riddle whereby to intermittently impart a rotative movement to said riddle, the riddle being arranged above the chute supporting the same so as to supply riddled material to said chute.

23. In a machine for filling molds, the combination of a sand projector, mechanism for driving the projector, a supporting structure comprising a plurality of pivoted members, and conveyers for feeding sand to the projector, sustained by and movable with said members respectively, the projector being mounted on the free end of one of said members.

24. In a machine for filling molds, the combination of a sand projector, mechanism for driving the projector, a supporting structure comprising a plurality of pivoted members, conveyers for feeding sand to the projector, sustained by and movable with said members respectively, the projector being mounted on the free end of one of said members, and means for vibrating one of the chutes.

25. In a foundry machine of the class described, the combination of a portable truck, a horizontally swinging jib mounted thereon, a horizontally swinging arm pivoted to said jib, conveying devices carried by said jib and arm, operating gears connected with the jib and with the arm, separate rack devices engaging said gears, and means under the control of an operator on the jib for actuating the said rack devices separately or together whereby to turn the jib and arm separately or together to adjust the same relatively to each other and relatively to the truck.

26. In a foundry machine of the class described, the combination of a portable truck, a jib mounted thereon to swing horizontally, a horizontally swinging arm carried by the jib, conveying devices for conducting sand from a point adjacent to the point of support of the jib to the free end portion of the swinging arm, elevating means for elevating sand and disposing same to be conducted off by said conveying devices, and sand projecting means carried by the free end portion of the swinging arm.

27. A machine substantially as claimed in claim 26, combined with manually controllable instrumentalities, operable from the jib for causing movement of the jib and arm whereby to effect various relative adjustments of said parts and correspondingly varied adjustments of the sand projecting means.

28. In mechanism for the purpose set forth, the combination of a jointed support comprising members movable horizontally together and relatively to each other, a motor carried by said support, a casing rigid with one of the support members, and a sand throwing member disposed within said casing and operatively connected with the motor.

29. In an apparatus for the purpose set forth, the combination of a rigid supporting member, a laterally extending arm mounted on said support for swinging movement, a motor support carried by the outer end of said arm and arranged to have horizontal swinging movement relative thereto, a motor, and a sand-throwing member operatively connected with said motor, both carried by the motor support.

30. In mechanism for the purpose set forth, the combination of a support comprising horizontally movable members pivoted together for relative horizontal movement, a motor mounted on said support, a sand projector casing rigidly secured to one supporting member, and a projecting member driven by said motor.

31. In a molding apparatus, the combination of a portable truck adapted to travel on a floor, a cross-conveyer mounted on the truck and adapted to feed sand laterally, a molding machine on the truck, an elevator disposed to receive sand directly from the cross conveyer and elevate it for use in the molding machine, and mechanism on the truck for driving the conveyer and elevator.

32. In a molding apparatus, the combination of a portable truck adapted to travel on a floor, a cross conveyer mounted on the truck and adapted to feed sand laterally, a molding machine on the truck, an elevator having its lower end coaxial with the conveyer and for elevating sand for use in the molding machine, and mechanism on the truck for driving the conveyer and elevator.

33. In a molding apparatus, the combination of a portable truck adapted to travel on a floor, a cross conveyer mounted on the truck and adapted to feed sand laterally, a molding machine on the truck, an elevator having its lower end transversely alined with and to receive sand directly from the cross conveyer and for elevating it for use in the molding machine, and mechanism on the truck for driving the conveyer and elevator.

34. In a molding apparatus, the combination of a portable truck adapted to travel on a floor, a molding machine on the truck, a transverse conveyer screw for sand at the front of the truck, an elevator also at the front of the truck, having its lower end disposed to receive sand directly from the screw, and for elevating sand for use in the molding machine, and mechanism on the truck for driving the screw and elevator.

35. In molding apparatus, the combination of a truck, a molding machine mounted on the truck, a transverse conveyer screw comprising members adapted to convey sand to a common point, an elevator having its lower end disposed to receive the sand at said point and elevate it for use in said machine, and mechanism on the truck for driving the screw and elevator.

36. In molding apparatus, the combination of a truck, a molding machine mounted on the truck, a transverse conveyer screw for sand, an elevator having its lower end connected to rotate with said screw, and adapted to elevate the sand for use in said machine, and mechanism on the truck for driving said screw.

ELMER O. BEARDSLEY.
WALTER F. PIPER.